United States Patent
Kim et al.

(10) Patent No.: US 9,391,456 B2
(45) Date of Patent: Jul. 12, 2016

(54) CURRENT GENERATOR

(71) Applicant: IMEC, Leuven (BE)

(72) Inventors: Sunyoung Kim, Leuven (BE); Refet Firat Yazicioglu, Leuven (BE)

(73) Assignee: IMEC, Leuven (BE)

( * ) Notice: Subject to any disclaimer, the term of this patent is extended or adjusted under 35 U.S.C. 154(b) by 351 days.

(21) Appl. No.: 14/107,399

(22) Filed: Dec. 16, 2013

(65) Prior Publication Data
US 2014/0175891 A1    Jun. 26, 2014

(30) Foreign Application Priority Data
Dec. 20, 2012 (EP) .................................... 12198406

(51) Int. Cl.
| | | |
|---|---|---|
| H02J 1/00 | (2006.01) | |
| H02J 3/00 | (2006.01) | |
| G06F 1/02 | (2006.01) | |
| G06F 1/03 | (2006.01) | |

(52) U.S. Cl.
CPC . *H02J 3/00* (2013.01); *G06F 1/022* (2013.01); *G06F 1/0321* (2013.01); *Y10T 307/724* (2015.04)

(58) Field of Classification Search
CPC .......... H02J 3/00; G06F 1/022; G06F 1/0321; Y10T 307/724
USPC ........................ 307/57, 71, 84; 341/153, 144
See application file for complete search history.

(56) References Cited

U.S. PATENT DOCUMENTS

| | | | | |
|---|---|---|---|---|
| 5,283,581 A * | 2/1994 | Miki | ......................... | G06G 7/14 341/118 |
| 6,831,581 B1 * | 12/2004 | Clara | ..................... | H03M 3/392 341/144 |
| 6,950,047 B1 * | 9/2005 | Piasecki | ................... | H03M 1/68 341/131 |
| 7,075,384 B2 * | 7/2006 | Tamura | .................. | H03L 7/1976 327/113 |

(Continued)

FOREIGN PATENT DOCUMENTS

EP      1035646 A1      9/2000

OTHER PUBLICATIONS

European Search Report, European Patent Application No. 12198406.6, dated Jul. 4, 2013.

(Continued)

*Primary Examiner* — Viet Q Nguyen
(74) *Attorney, Agent, or Firm* — McDonnell Boehnen Hulbert & Berghoff LLP

(57) ABSTRACT

A current generator is disclosed. An example current generator includes a plurality of current cells connected in parallel, each current cell being connected to a switch. The current generator further includes a first summer configured to sum the output of each current cell of a first subset of the plurality of current cells and a second summer configured to sum the output of each current cell of a second subset of the plurality of current cells. The current generator also includes a combiner configured to combine the outputs of the first and second summers. Further, each switch is switchable according to a sequence to generate a summed output of the current cells at a plurality of quantization levels to generate positive and/or negative alternations of a pseudo-sinusoidal, alternating current.

18 Claims, 7 Drawing Sheets

(56) References Cited

U.S. PATENT DOCUMENTS

| | | | | |
|---|---|---|---|---|
| 7,466,252 | B1* | 12/2008 | Radulov | H03M 1/1061 341/120 |
| 8,018,365 | B1* | 9/2011 | Tsai | H03M 3/39 341/143 |
| 8,094,055 | B2* | 1/2012 | Gaknoki | H03M 1/68 341/118 |
| 8,847,807 | B2* | 9/2014 | Bandyopadhyay | H03M 1/0617 330/251 |
| 9,046,908 | B2* | 6/2015 | Gong | G05F 1/46 |
| 9,065,477 | B2* | 6/2015 | Rajasekhar | H03M 1/0678 |
| 9,136,854 | B1* | 9/2015 | Hong | H03M 1/66 |
| 2002/0008652 | A1* | 1/2002 | Takeya | H03M 1/066 341/153 |
| 2005/0038846 | A1* | 2/2005 | Devendorf | G06G 7/14 708/801 |
| 2012/0032829 | A1* | 2/2012 | Kier | H03M 1/068 341/144 |
| 2012/0049904 | A1 | 3/2012 | Kuttner et al. | |
| 2013/0187803 | A1* | 7/2013 | Kaald | H03M 3/37 341/143 |
| 2015/0042498 | A1* | 2/2015 | Onody | H03M 1/66 341/144 |

OTHER PUBLICATIONS

Min, Mart et al., "Improvement of Lock-In Electrical Bio-Impedance Analyzer for Implantable Medical Devices", IEEE Transactions on Instrumentation and Measurement, vol. 56, No. 3, Jun. 2007, pp. 968-974.

Yan, Long et al., "A 3.9mW 25-Electrode Reconfigured Thoracic Impedance/ECG SoC With Body-Channel Transponder", ISSCC 2010, Session 27, Directions in Health, Energy & RF, 27.3, Feb. 10, 2010, pp. 490-491.

Yazicioglu, Refet Firat et al., "A 30uW Analog Signal Processor ASIC for Biomedical Signal Monitoring", ISSCC 2010, Session 6, Displays and Biomedical Devices, 6.6, Feb. 8, 2010, pp. 124-125.

* cited by examiner

CURRENT GENERATOR

CROSS-REFERENCE TO RELATED APPLICATIONS

This application claims priority under 35 U.S.C. §119(b) to European Patent Application EP 12198406.6, filed on Dec. 20, 2012, the full disclosure of which is incorporated herein by reference.

TECHNICAL FIELD

The disclosure relates to a current generator and a method of generating a current. More particularly, but not exclusively, the disclosure relates to generating an excitation current for a biopotential measurement circuit.

BACKGROUND

Bio-signal monitoring systems for monitoring a biological subject may involve measurement of the electrical potential differences in the tissue of the subject (biopotential). This is achieved by applying an excitation current across, in vivo, electrodes. Measurements are taken on a continuous basis. Therefore, the monitor is invariably implanted. Therefore, low power consumption whilst maintaining accuracy of the measurements is desirable.

Therefore design strategies for each building block and signal monitoring methodology focus on low power consumption. In addition, measurement accuracy has to be guaranteed with minimized power consumption. There are two things which determine monitoring accuracy of portable bio-signal monitoring system. One is accuracy of the building block and the other is accuracy of monitoring method. To achieve high accuracy measurement requires high power consumption for internal building blocks and high accurate external components which increase form factor of the system.

One specific bio-signal monitoring system is intra-thoracic fluid analysis. Such a measurement system is often required to resolve biopotential down to mΩ-range change (AC) superimposed on up to kΩ-range average (DC) impedance. In standard practice, this can be achieved by using a purely sinusoidal current source with very good harmonic distortion to minimize the error of impedance measurement as disclosed in, for example, Yan, L.; Bae, J.; Lee, S.; Kim, B.; Roh. T.; Song, K.; Yoo, H-J.;, "A 3.9 mW 25-electrode Reconfigurable Thoracic Impedance/ECG SoC with Body-Channel Transponder," *IEEE International Solid-State Circuits Conference*, vol., no., pp.490-491, 7-11 Feb. 2010. However, this approach consumes many mWs of power which is not acceptable for an implantable device. There is research that uses multi-level quantized signal as a modulation and demodulation signal as disclosed in M. Min, and T. Parve, "Improvement of Lock-in Electrical Bio-Impedance Analyzer for Implantable Medical Devices," IEEE Tran. On Instrumentation and Measurement, 2007. As a result, pW-range power consumption can be achieved by using a square-wave current combined with quadrature demodulation as disclosed, for example, in Yazicioglu, R. F.; Kim, S.; Torfs, T.; Merken, P.; Van Hoof, C.;, "A 30 µW Analog Signal Processor ASIC for biomedical signal monitoring," *IEEE International Solid-State Circuits Conference*, vol., no., pp.124-125, 7-11 Feb. 2010. This technique, however, requires multi-level quantized current as well as multi-level demodulation amplifier which has a complex architecture and consumes more power. In addition, this technique requires modulation and demodulation signal which have accurately generated phase shift. This limits programmability of the generated signal as well as the measurement accuracy can be degraded due to the phase variations. Further, resulting in intolerable measurement errors as high as 23% because the quadrature demodulation will fold all odd harmonics of the square wave current into the baseband.

OVERVIEW

The present disclosure provides a current generator that would be suitable for use in an implantable biopotential monitoring system which mitigates the above-mentioned drawbacks.

According to an example of the present disclosure, there is provided a current generator comprising a plurality of current cells connected in parallel, each current cell being connected to a switch; a summer configured to sum the output of each current cell; wherein each switch is switchable according to a sequence to generate a summed output of the current cells at a plurality of quantisation levels to generate positive and/or negative alternations of a pseudo-sinusoidal, alternating current.

According to another example aspect of the present disclosure, there is provided a biopotential measurement system comprising a current generator such as the current generator described above.

According to yet another example aspect of the present disclosure, there is provided a method for generating a current, the method comprising the steps of switching a plurality of current cells, each current cell being connected in parallel; summing the output of each current cell of a first subset of the plurality of current cells for generating positive alternations of the pseudo-sinusoidal, alternating current; summing the output of each current cell of a second subset of the plurality of current cells for generating negative alternations of the pseudo-sinusoidal, alternating current; combining the summations of the output of each current cell of the first subset of the plurality of current cells and the output of each current cell of the second subset of the plurality of current cells to generate a pseudo-sinusoidal alternating current; and wherein switching the plurality of current cells comprises switching each current cell according to a sequence to generate a summed output of the current cells at a plurality of quantisation levels to generate positive and/or negative alternations of a pseudo-sinusoidal, alternating current.

To achieve a high accurate biopotential monitoring system with low power consumption, a multi-mode current injection circuit may be used to generate the current. A pseudo-sine wave current may be generated via internal digital control circuit which is particularly useful for monitoring biopotential as well as conventional square wave excitation current.

Each current cell of the first subset of the plurality of current cells may comprise a current source. Each switch of the current cells of the first subset of the plurality of current cells may be switched according to the sequence to generate a summed output of the current cells of the first subset at a plurality of quantisation levels to generate the positive alternations of the pseudo-sinusoidal, alternating current.

Each current cell of the second subset of the plurality of current cells may comprise a current sink. Each switch of the current cells of the second subset of the plurality of current cells may be switched according to the sequence to generate a summed output of the current cells of the second subset at a plurality of quantisation levels to generate the negative alternations of the pseudo-sinusoidal, alternating current.

In an example embodiment, the combiner further comprises a chopper configured to chop alternating alternations of the outputs of the first and second summers to generating alternate positive and negative alternations of a pseudo-sinusoidal, alternating current.

In a further example embodiment, the current generator further comprises a control module configured to provide the sequence to generate the summed output of the current cells and to adjust the number of quantization levels.

The control module further may comprise a look-up table configured to store the coding for the sequence. The look-up table may comprise an integer look-up table.

In yet a further example embodiment, the control module is configured to adapt the sequence in order to change the frequency and amplitude of the generated pseudo-sinusoidal, alternating current. Further, the control module is configured to change the switchable frequency of each switch and the combination frequency of the combiner. Still further, the control module is configured to increase or decrease the unit current of each current cell to increase or decrease the amplitude of the pseudo-sinusoidal alternating current.

These as well as other aspects, advantages, and alternatives, will become apparent to those of ordinary skill in the art by reading the following detailed description, with reference where appropriate to the accompanying drawings.

BRIEF DESCRIPTION OF THE DRAWINGS

Various exemplary embodiments are described herein, by way of example only, with reference to the following drawings, wherein like numerals denote like entities. The drawings described are schematic and are non-limiting.

DETAILED DESCRIPTION

Figure 1:
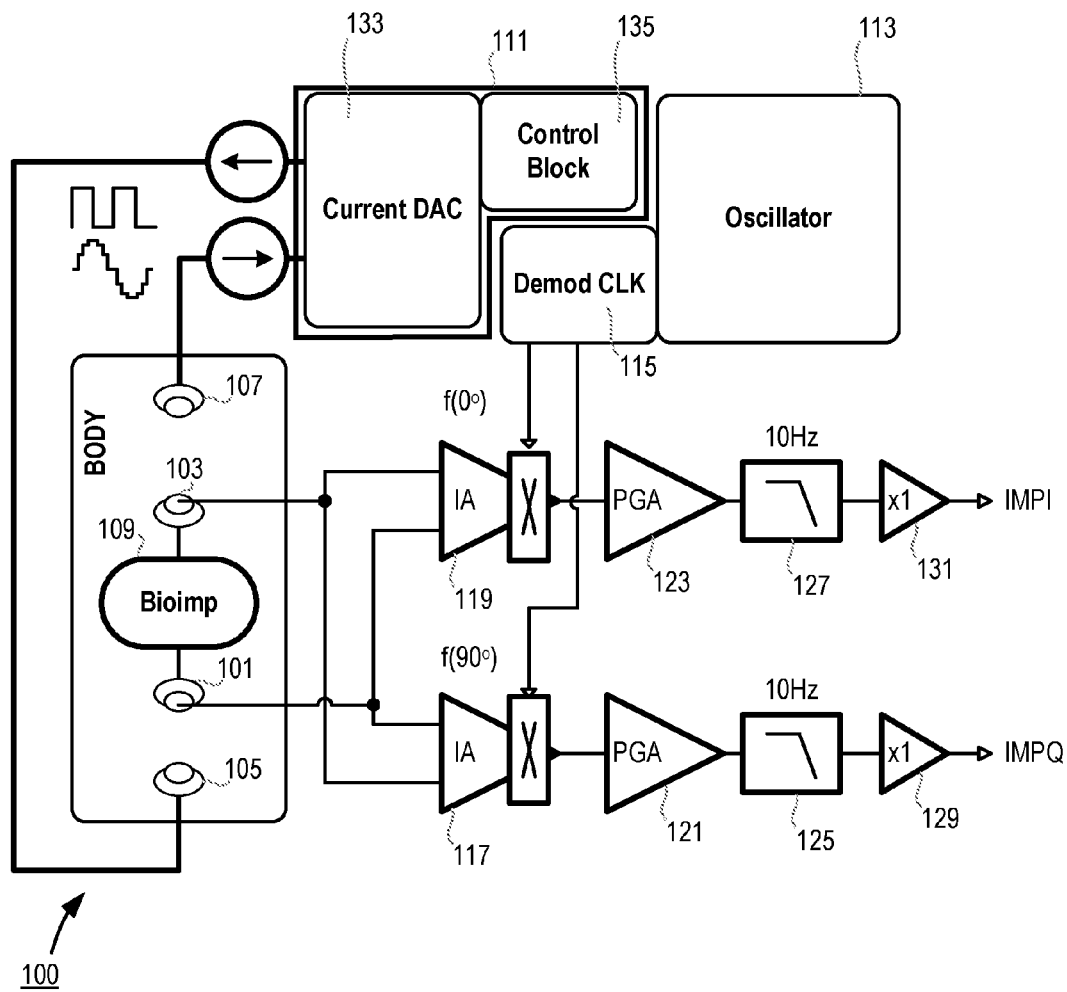
FIG. 1 is a simplified schematic of an example of a bio-impedance measuring circuit including the current generator of an example embodiment of the present disclosure.

With reference to FIG. 1, an example biopotential circuit 100 according to an example embodiment of the present disclosure comprises a pair of receive electrodes 101, 103 and a pair of drive electrodes 105, 107. The pair of receive electrodes 101, 103 is implanted into the patient's tissue. The drive electrodes 105, 107 are positioned either side of the receive electrodes to enclose an area 109 of the tissue. The drive electrodes may be positioned on the surface of the tissue as is known in the art.

An excitation current is applied to the drive electrodes 105, 107 and the potential of the enclosed area 109 of the tissue is measured by the receive electrode pair 101, 103. The biopotential circuit 100 further comprises a current generator 111 for generating the excitation current described in more detail below. The bio-potential circuit 100 further comprises an oscillator 113 and a demodulation clock 115. The oscillator 113 provides the reference clocks for the current generator 111 and the demodulation clock 115.

The receive electrode outputs are fed to first and second analyzers 117, 119. Each analyzer 117, 119 is clocked by the demodulation clock 115. The second analyzer 119 compares the in phase component of the outputs of the pair of receive electrodes 101, 103 and the first analyzer 117 compares the quadrature phase components of the outputs of the pair of receive electrodes 101, 103 to determine the biopotential of the area 109 of the tissue. The respective components of the biopotential pass to respective first and second programmable gain amplifiers 121, 123, respective filters 125, 127 and buffers 129, 131 to output the respective in phase component of the biopotential and the quadrature phase component of the bio-potential.

The current generator 111 comprises a current digital-to-analog converter (DAC) 133 and a control module 135. As shown in more detail in FIG. 2. The control module 135 comprises a code generation module 201, a clock divider module 203 and a DAC selection module 205.

The current DAC 133 comprises a first subset 207 of a plurality of parallel current cells 209_1 to 209_n. Each current cell 209_1 to 209_n of the first subset 207 comprises a pMOSFET 211_1 to 211_n. The pMOSFETs 211_1 to 211_n may be substantially similar, each generating the same amount of current. The source of each pMOSFET 211_1 to 211_n of the first subset 207 is connected in parallel to a common supply voltage $V_s$. The gate of each pMOSFET 211_1 to 211_n of the first subset 207 is connected in common to a first bias voltage $V_{biasp}$. The drain of each pMOSFET 211_1 to 211_n of the first subset 207 is connected to the respective source of a cascode pMOSFET 218_1 to 218_n of a first subset 217. The drain of each cascode pMOSFET 218_1 to 218_n of the first subset 217 is connected to a first terminal of a respective switch 213_1 to 213_n of a first subset 215. The second terminals of each switch 213_1 to 213_n of the first subset 215 are connected together to a first input of a combiner 219. The gate of each cascade pMOSFET 218_1 to 218_n of the first subset 217 is connected to a third bias $V_{casp}$. The current cells 209_1 to 209_n of the first subset 207 provide a current source to generate positive alternations of a pseudo-sinusoidal alternating current.

The current DAC 133 further comprises a second subset 221 of a plurality of parallel current cells 223_1 to 223_n. Each current cell 223_1 to 223_n of the second subset 221 comprises an nMOSFET 225_1 to 225_n. The nMOSFET 225_1 to 225_n may be substantially similar, each sinking the same amount of current. The source of each nMOSFET 225_1 to 225_n of the second subset 221 is connected in parallel to ground. The gate of each nMOSFET 225_1 to 225_n of the second subset 221 is connected in common to a second bias voltage Vbiasn. The drain of each nMOSFET 225_1 to 225_n of the second subset 221 is connected to the source of a respective cascode nMOSFET 232_1 to 232_n of a second subset 231. The drain of each cascode nMOSFET 232_1 to 232_n of the second subset 231 is connected to the first terminal of a respective switch 227_1 to 227_n of a second subset 229. The second terminal of each switch 227_1 to 227_n of the second subset 229 are connected together to a second input of the combiner 219. The gate of each nMOSFET 232_1 to 232_n of the second subset 231 is connected to a fourth bias Vcasn. The current cells 223_1 to 223_n of the second subset 221 provide a current sink to generate the negative alternations of a pseudo-sinusoidal alternating current.

Figure 3:
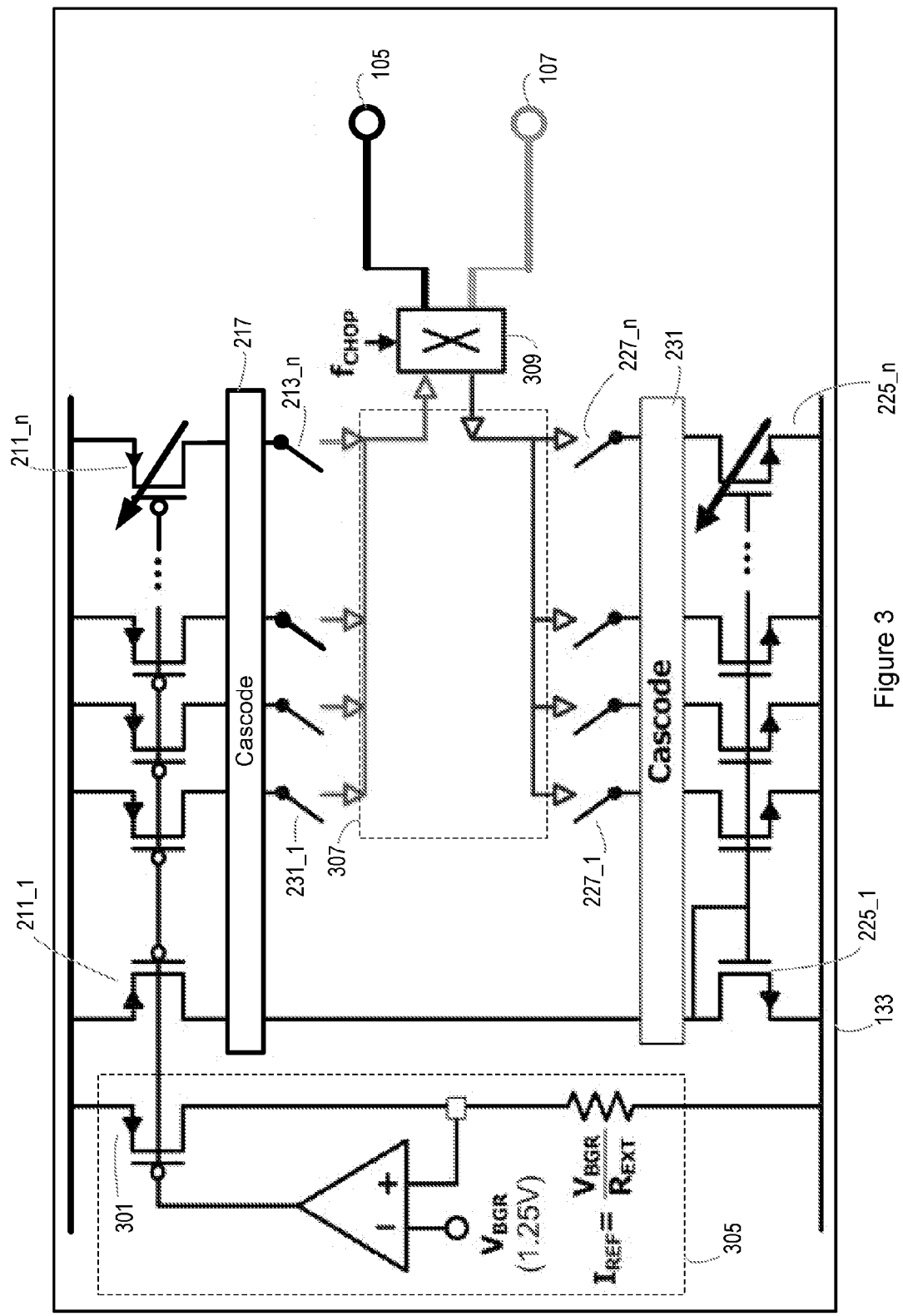
FIG. 3 is a simplified schematic of the current digital-to-analog converter of the current generator of FIG. 2.

The example current DAC 133 is shown in more detail in FIG. 3. The first and second bias voltages $V_{biasp}$, $V_{biasn}$ are provided via a current mirror pMOSFET 301. A reference current $I_{REF}$ is provided to the current mirror by a current reference circuit 305. The combiner 219 comprises a combination module 307 and a chopper 309. The chopper 309 outputs the generated components of the excitation current and the negative $I_2$ for drive electrodes 105, 107.

Figure 4:
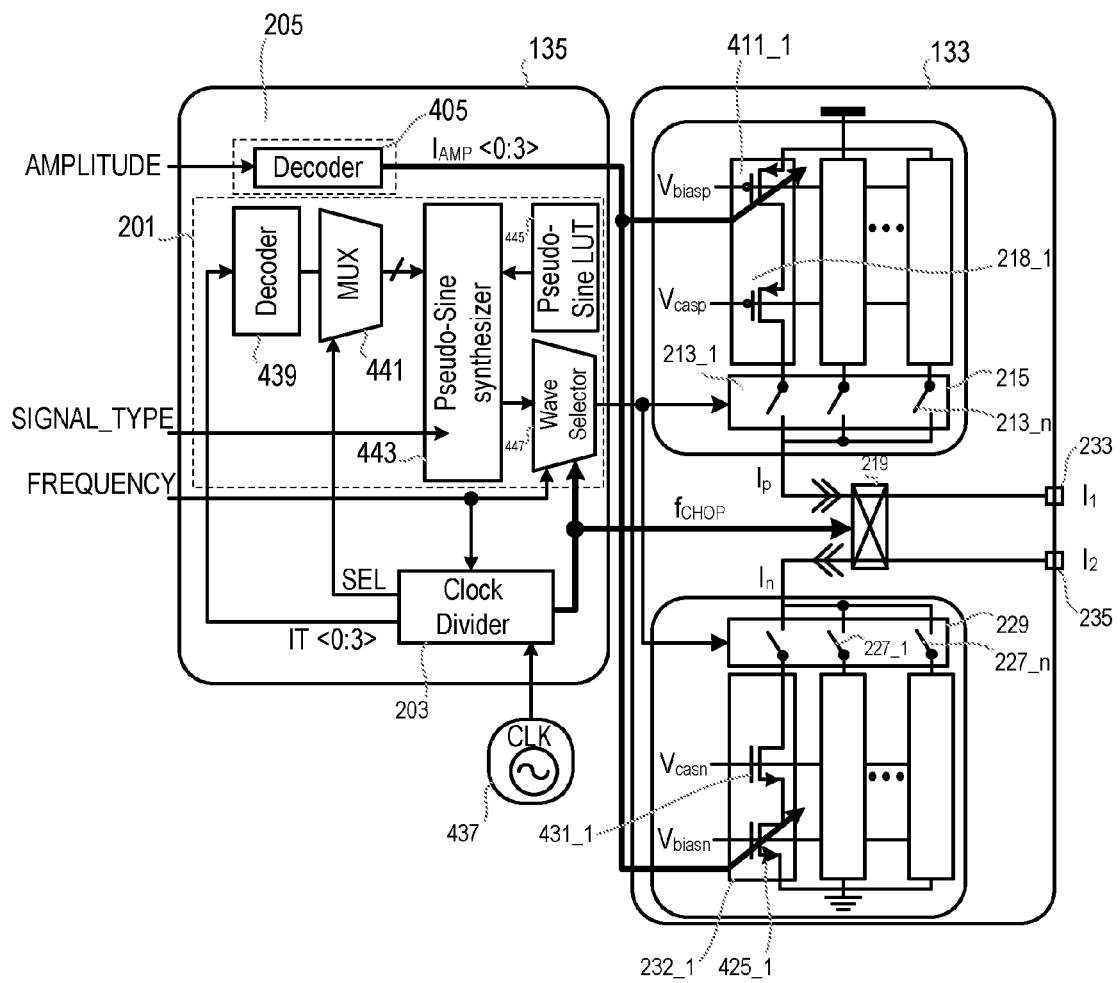
FIG. 4 is a simplified schematic of the current generator of another example embodiment of the present disclosure.

In an example embodiment as shown in FIG. 4, the DAC selection module 205 comprises a first decoder 405. The output of the first decoder 405 provides the value to control the current generated by each current cell 209_1 to 209_n of the first subset 207 or sunk by each current cell 223_1 to 223_n of the second subset 221. In this embodiment, each current cell comprises a plurality of MOSFETs connected in parallel (illustrated as a single variable MOSFET 411_1 and 425_1 in FIG. 4 for simplicity), each of the parallel connected MOSFETs are turned on and off based on the control signal IAMP output by the first decoder 405. The input of the decoder 405 is connected to a third control signal AMPLITUDE. The code generation module 201 comprises a second decoder 439. The output of the second decoder 439 is connected to a multiplexer 441. The output of the multiplexer 441 is connected to a pseudo-sine synthesizer 443. The pseudo-sine synthesizer 443 is connected to a look-up table 445. The output of the pseudo-sine synthesizer 443 is connected to a wave selector 447. The output of the wave selector 447 is provided to control switching of the switches 213_1 to 213_n of the first subset 215 and the switches 227_1 to 227_n of the second subset 229. The pseudo-sine synthesizer 443 receives a first control signal SIGNAL_TYPE and the wave selector 447 receives a second control signal FREQUENCY. The clock divider module 203 also receives the second control signal FREQUENCY. The outputs of the clock divider 203 are connected to the second decoder 439 of the code generation module 201, the multiplexer 441 of the code generation module 201, the wave selector 447 of the code generation module 201 and the combiner 219. The clock divider 203 has a reference clock 437 connected to the clocking terminal of the clock divider 203.

Figure 2:
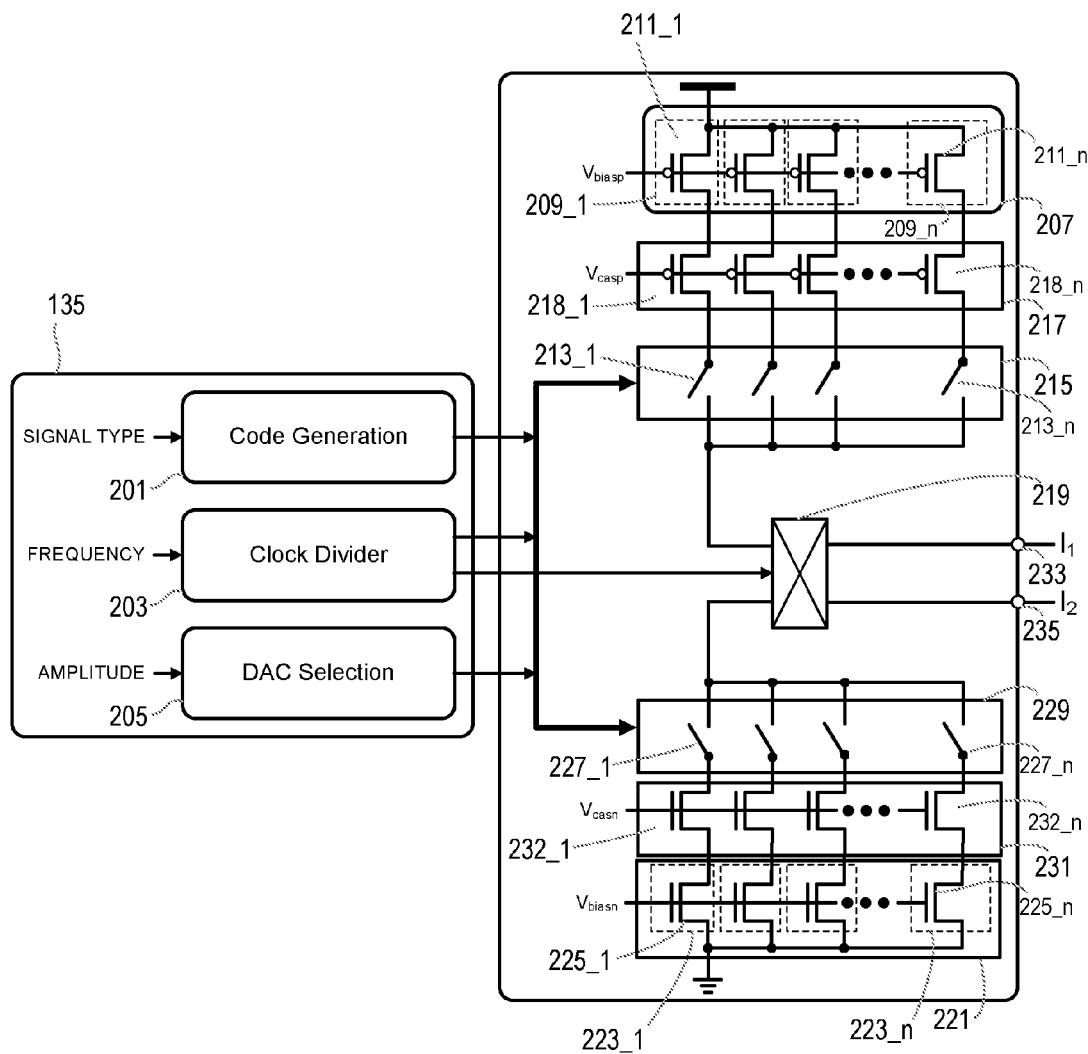
FIG. 2 is a simplified schematic of the current generator according to an example embodiment of the present disclosure.

Operation of the example current generator of FIGS. 2 to 4 will be described with reference to FIGS. 5 to 8.

The actuation of the switches is controlled by the control module 135. The switches are actuated according to a sequence. The coding for the switching sequence is stored in the look-up table 445 of the code generation module 201. The sequence is selected by the pseudo-sine synthesizer 443 from the coding stored in the look-up table 445 in response to the first control signal, SIGNAL_TYPE. The clock divider module 203 outputs the required modulation frequency selected by the second control signal, FREQUENCY. The wave selector 447 controls the switching frequency of each switch of the first and second subsets 215, 229 in accordance with the sequence provided by the pseudo-sine synthesizer 443. The DAC selection module 205 controls the amplitude of the modulation current output by the current generator in response to a third control signal AMPLITUDE by controlling the unit current for each current cell 209_1 to 209_n and 225_1 to 225_n. The unit current of the first subset and the second subset is substantially the same. In an example, to generate pseudo-sine-wave, an integer look-up table (LUT) with 64 values is designed which enables 16-level quantization. The third control signal AMPLITUDE is decoded by the first decoder 405 (in this specific example a 2 to 4 decoder) to generate a 4-bit $I_{AMP}$<0:3> signal. In this example, each current cell comprises four MOSFETs 411_1, 423_1 (for simplicity, the four MOSFETs are illustrated in the Figure as a single MOSFET) connected in parallel, each of the four MOSFETs are turned on and off based on the control signal $I_{AMP}$<0:3> output by the first decoder 405 to control the amplitude of the pseudo-sine waveform. The clock divider 203 generates a 4-bit IT<0:3> signal. This is used to generate a 14 bit signal output by the multiplexer 441 which controls the pseudo-sine synthesizer 443 for accessing the LUT 445 with a SEL signal. SIGNAL_TYPE control signal selects the type of waveform for the output current, for example, a pseudo-sine-wave or square-wave. The 14 bit signals after Wave Selector are used as a switch control signals inside the unit current DACs.

Since the control signals, SIGNAL_TYPE, FREQUENCY and AMPLITUDE are independently provided to the current generator, a high programmable modulation current is generated.

The switching 601, 605 of each switch of the first and second subset is therefore controlled in accordance with a sequence determined by the output of the DAC selection module 205. The output of each current cell 209_1 to 209_n of the first subset are summed, 603, by a first summer, formed in this embodiment, by the common connection of the switches. The output of the first summer is provided on the first input terminal of the combiner 219.

The output of each current cell 223_1 to 223_n of the second subset are summed, 607 by the second summer, formed in this embodiment, by the common connection of the switches 227_1 to 227_n of the second subset 229. The output of the second summer is provided on the second input terminal of the combiner 219.

Figures 5A, 5B, 5C, 5D:
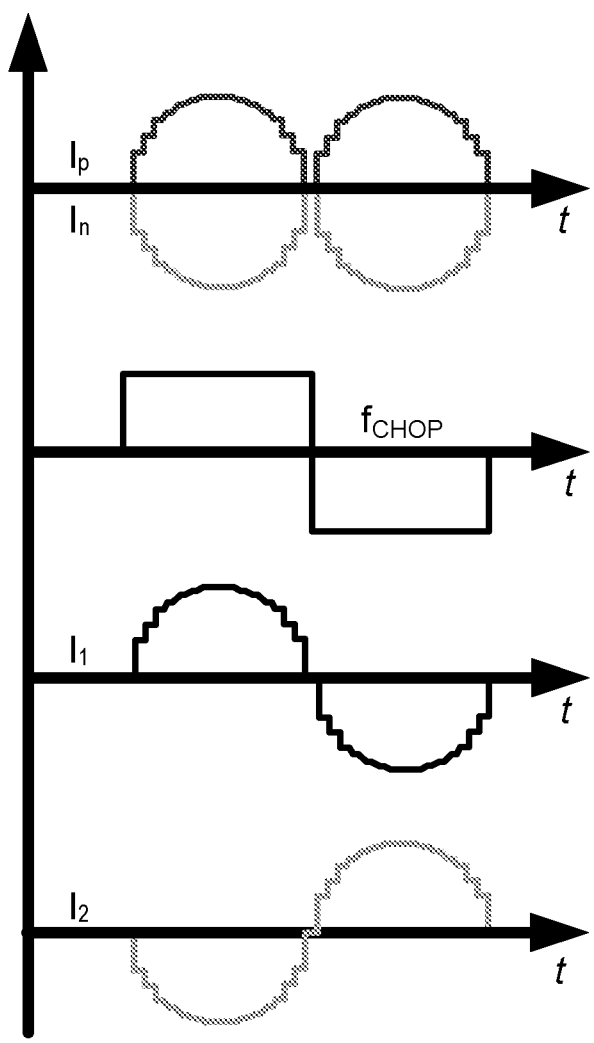
FIG. 5a is a graphical representation of the output of the combiner of an example embodiment of the present disclosure.
FIG. 5b is a graphical representation of the chopper waveform of the chopper of an example embodiment of the present disclosure.
FIG. 5c is a graphical representation of one component $I_1$, of the generated current of the current generator of an example embodiment of the present disclosure.
FIG. 5d is a graphical representation of the second component $I_2$ of the generated current of the current generator of an example embodiment of the present disclosure.
Figure 6:
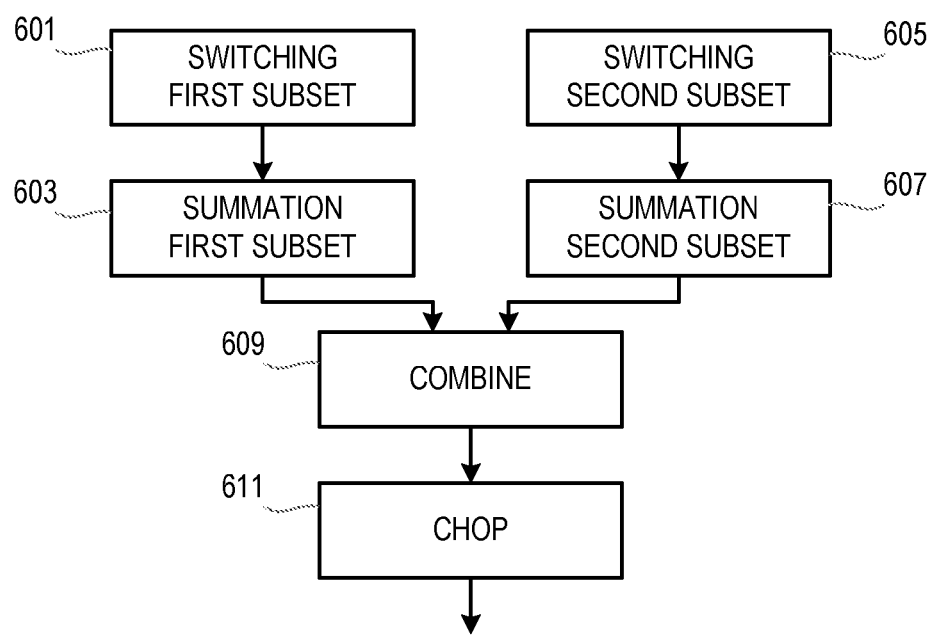
FIG. 6 is a flowchart of a method of generating a current according to an example embodiment of the present disclosure.
Figure 7:
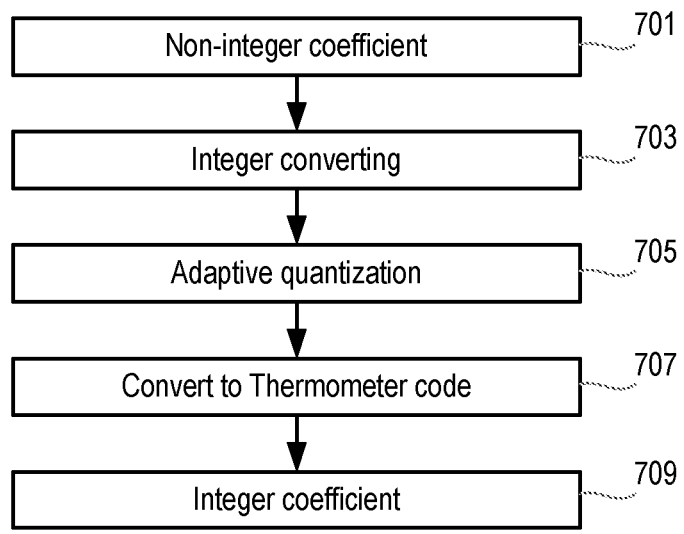
FIG. 7 is a flowchart of a method of generating the integer coefficient for the look-up table of the controller of the current generator according to an example embodiment of the present disclosure.

The summation M*$I_{REF}$+$\Delta I_p$ (wherein M is the number of current cells of the first subset connected at any one time, $\Delta I_p$ is the error of the summed output of the current cells of the first subset 207 due to mismatch) and the summation—M*$I_{REF}$−$\Delta I_n$ (wherein M is the number of current cells of the second subset connected at any one time, $\Delta I_n$ is the error of the summed output of the current cells of the second subset 221 due to mismatch) are combined, 609, to form the combined waveform as shown in FIG. 5a. The combined waveform is input to the chopper 309 which combines the waveform of FIG. 5a with the square waveform of FIG. 5b to output and $I_2$ as shown in FIGS. 5c and 5d. The alternate alternations are then chopped, 611 to form a pseudo-sinusoidal alternating current $I_1$=2M*$I_{REF}$+$\Delta(I_p+I_n)$ and the negative $I_2$=−{2M*$I_{REF}$+$\Delta(I_p+I_n)$}.

Figure 8:
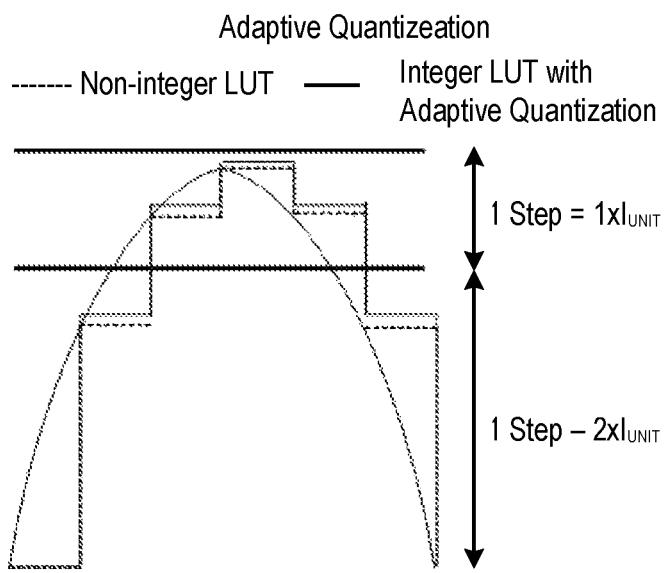
FIG. 8 is a graphical representation of a comparison of the waveforms generated by a non-integer look-up table and the integer look-up table according to an example embodiment of the present disclosure.

In an example, to limit the Total Harmonic Distortion (THD) due to folded odd harmonics to less than 1%, a 16-level quantized-sinusoidal current source is implemented which will suppress all harmonics power below the 63rd harmonic. In order to generate such a quantized current source with ideal sinewave characteristics, the switches of the DAC are switched in accordance with a code retrieved from the look-up table. An adaptively quantized integer LUT is used to reduce conversion error and reduce the requirements of a very high frequency clock as well as a high resolution DAC and this increasing power consumption. By assigning different number of currents cells based on the amplitude of the resulting modulation signal, conversion errors decrease by 1.71-fold. Using current cells minimizes the mismatch of the current generator and prevents glitches due to simultaneous switching of the DAC as well as enables easy configuration of the injection current amplitude. The integer LUT is achieved by the method shown in FIG. 7. Each non-integer coefficient for generating the pseudo-sinewave (shown in FIGS. 5c and 5d) is received, 701, and converted into an integer, 703, for example, by rounding to the nearest integer. Adaptive quantisation, 705 is carried out on the converted integer so that the level of the quantisation is varied depending on the slope of the generated sine wave. As a result, when the slope is gentle, the quantisation is coarse with greater interval between changes in the quantisation level, for steeper slopes, the change in quantisation is lower at smaller change intervals. The adapted integer is then converted, 707 to Thermometer code and stored in the look-up for later retrieval. As illustrated in FIG. 8, the ideal non-integer LUT and the integer LUT of an example embodiment of the present disclosure lead to similar performance. As a result, demodulation can still be executed by a square wave using chopper demodulation while assuring 1% THD.

By adopting a pseudo-sine wave current generator with low power current DAC architecture, high resolution bio-impedance monitoring is enabled as well as low power monitoring by adopting a square wave current generator.

The use of the PMOS and NMOS of the current cells of the DAC to generate the positive and negative alternations enables the NMOS sink matrix to reuse the current from the PMOS source matrix to maximize the power efficiency. Further, the output chopper switch can mitigate the AC current mismatch between the current source and the current sink by alternating outputs at $f_{CHOP}$ frequency. Furthermore, scaling the size of each PMOS and NMOS can simply adjust the current magnitude (10-40 $\mu A_{p-p}$) to enable the high dynamic biopotential measurement range.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims, along with the full scope of equivalents to which such claims are entitled. It is also to be understood that the terminology used herein is for the purpose of describing particular embodiments only, and is not intended to be limiting.

Although embodiments of the present disclosure have been illustrated in the accompanying drawings and described in the foregoing detailed description, it will be understood that the invention is not limited to the embodiments disclosed, but capable of numerous modifications without departing from the scope of the invention as set out in the following claims. In the claims, the word "comprising" does not exclude other elements or steps, and the indefinite article "a" or "an" does not exclude a plurality. Any reference signs in the claims should not be construed as limiting the scope.

The invention claimed is:

1. A current generator comprising:
a plurality of current cells connected in parallel, each current cell being connected to a switch;
a first summer configured to sum an output of each current cell of a first subset of the plurality of current cells and a second summer configured to sum an output of each current cell of a second subset of the plurality of current cells; and
a combiner configured to combine the outputs of the first and second summers,
wherein each switch is switchable according to a sequence to generate a summed output of the current cells at a plurality of quantization levels to generate positive and/or negative alternations of a pseudo-sinusoidal, alternating current, wherein each current cell of the second subset of the plurality of current cells comprises a current sink, wherein each switch of the current cells of the second subset of the plurality of current cells is switched according to the sequence to generate a summed output of the current cells of the second subset at a plurality of quantization levels to generate the negative alternations of the pseudo-sinusoidal, alternating current.

2. The current generator of claim 1, wherein each current cell of the first subset of the plurality of current cells comprises a current source and wherein each switch of the current cells of the first subset of the plurality of current cells is switched according to the sequence to generate a summed output of the current cells of the first subset at a plurality of quantization levels to generate the positive alternations of the pseudo-sinusoidal, alternating current.

3. The current generator of claim 1, wherein the combiner further comprises a chopper configured to chop alternating alternations of the outputs of the first and second summers to generate alternate positive and negative alternations of a pseudo-sinusoidal, alternating current.

4. The current generator of claim 1, wherein the current generator further comprises a control module configured to provide the sequence to generate the summed output of the current cells and to adjust the number of quantization levels.

5. The current generator of claim 4, wherein the control module further comprises a look-up table configured to store coding for the sequence.

6. The current generator of claim 5, wherein the look-up table comprises an integer look-up table.

7. The current generator of claim 4, wherein the control module is further configured to adapt the sequence in order to change a frequency and/or amplitude of the generated pseudo-sinusoidal, alternating current.

8. The current generator of claim 7 wherein the control module is configured to change a switchable frequency of each switch and a combination frequency of the combiner.

9. The current generator of claim 7 wherein the control module is configured to increase or decrease a unit current of each current cell to increase or decrease the amplitude of the pseudo-sinusoidal alternating current.

10. A biopotential measurement system comprising the current generator of claim 1.

11. A method for generating a current, the method comprising:
switching a plurality of current cells, wherein each current cell is connected in parallel, wherein each current cell is connected to a switch;
summing an output of each current cell of a first subset of the plurality of current cells for generating positive alternations of the pseudo-sinusoidal, alternating current;
summing an output of each current cell of a second subset of the plurality of current cells for generating negative alternations of the pseudo-sinusoidal, alternating current;
combining the summations of the output of each current cell of the first subset of the plurality of current cells and the output of each current cell of the second subset of the plurality of current cells to generate a pseudo-sinusoidal alternating current; and wherein switching the plurality of current cells comprises switching each current cell according to a sequence to generate a summed output of the current cells at a plurality of quantization levels to generate positive and/or negative alternations of a pseudo-sinusoidal, alternating current, wherein each switch of the current cells of the second subset of the plurality of current cells is switched according to the sequence to generate a summed output of the current cells of the second subset at a plurality of quantization levels to generate the negative alternations of the pseudo-sinusoidal, alternating current.

12. The method of claim 11, wherein the method further comprises:
chopping alternating alternations of the combined alternations to generate alternate positive and negative alternations of the pseudo sinusoidal alternating current.

13. A current generator comprising:
a plurality of current cells connected in parallel, each current cell being connected to a switch;
a first summer configured to sum an output of each current cell of a first subset of the plurality of current cells and a second summer configured to sum an output of each current cell of a second subset of the plurality of current cells; and
a combiner configured to combine the outputs of the first and second summers, wherein each switch is switchable according to a sequence to generate a summed output of the current cells at a plurality of quantization levels to generate positive and/or negative alternations of a pseudo-sinusoidal, alternating current, wherein the current generator further comprises a control module configured to provide the sequence to generate the summed output of the current cells and to adjust the number of quantization levels.

14. The current generator of claim 13, wherein the control module further comprises a look-up table configured to store coding for the sequence.

15. The current generator of claim 14, wherein the look-up table comprises an integer look-up table.

16. The current generator of claim 13, wherein the control module is further configured to adapt the sequence in order to change a frequency and/or amplitude of the generated pseudo-sinusoidal, alternating current.

17. The current generator of claim 16 wherein the control module is configured to change a switchable frequency of each switch and a combination frequency of the combiner.

18. The current generator of claim 16 wherein the control module is configured to increase or decrease a unit current of each current cell to increase or decrease the amplitude of the pseudo-sinusoidal alternating current.

* * * * *